(12) United States Patent
McElreath

(10) Patent No.: US 6,281,832 B1
(45) Date of Patent: Aug. 28, 2001

(54) METHOD AND APPARATUS FOR USING STATISTICAL DATA PROCESSING IN ALTIMETER AND TERRAIN AWARENESS INTEGRITY MONITORING SYSTEMS

(75) Inventor: Kenneth W. McElreath, Cedar Rapids, IA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/386,828

(22) Filed: Aug. 31, 1999

(51) Int. Cl.[7] .................................................. G01S 13/94
(52) U.S. Cl. ........................ 342/65; 342/63; 342/120; 342/195; 701/300; 701/301; 340/963
(58) Field of Search ........................... 342/26–32, 36–41, 342/52, 59, 61–65, 104, 105, 107, 115, 118–123, 175, 190–197, 357.01–357.17; 701/200, 207, 217, 300, 301, 302; 340/945, 961, 963

(56) References Cited

U.S. PATENT DOCUMENTS

| 3,706,988 | * | 12/1972 | Bayle et al. ........................... 342/52 |
| 4,144,571 | * | 3/1979 | Webber ................................. 701/217 |
| 4,520,445 | * | 5/1985 | Keearns ................................ 701/217 |
| 5,410,317 | * | 4/1995 | Ostrom et al. ........................ 342/65 |

FOREIGN PATENT DOCUMENTS

0928952 A1 * 7/1999 (EP) ................................. G01C/5/00

* cited by examiner

Primary Examiner—Bernarr E. Gregory
(74) Attorney, Agent, or Firm—Nathan O. Jensen; Kyle Eppele

(57) ABSTRACT

A baro altitude and terrain warning system with an integrity monitoring function which uses a radar altimeter to generate instantaneous altitude signals used to confirm the validity of a baro altitude signal, generated by a baro altimeter and an expected terrain clearance signal, provided by the terrain warning system, and for generating an alert when insufficient correlation exists between such signals.

27 Claims, 3 Drawing Sheets

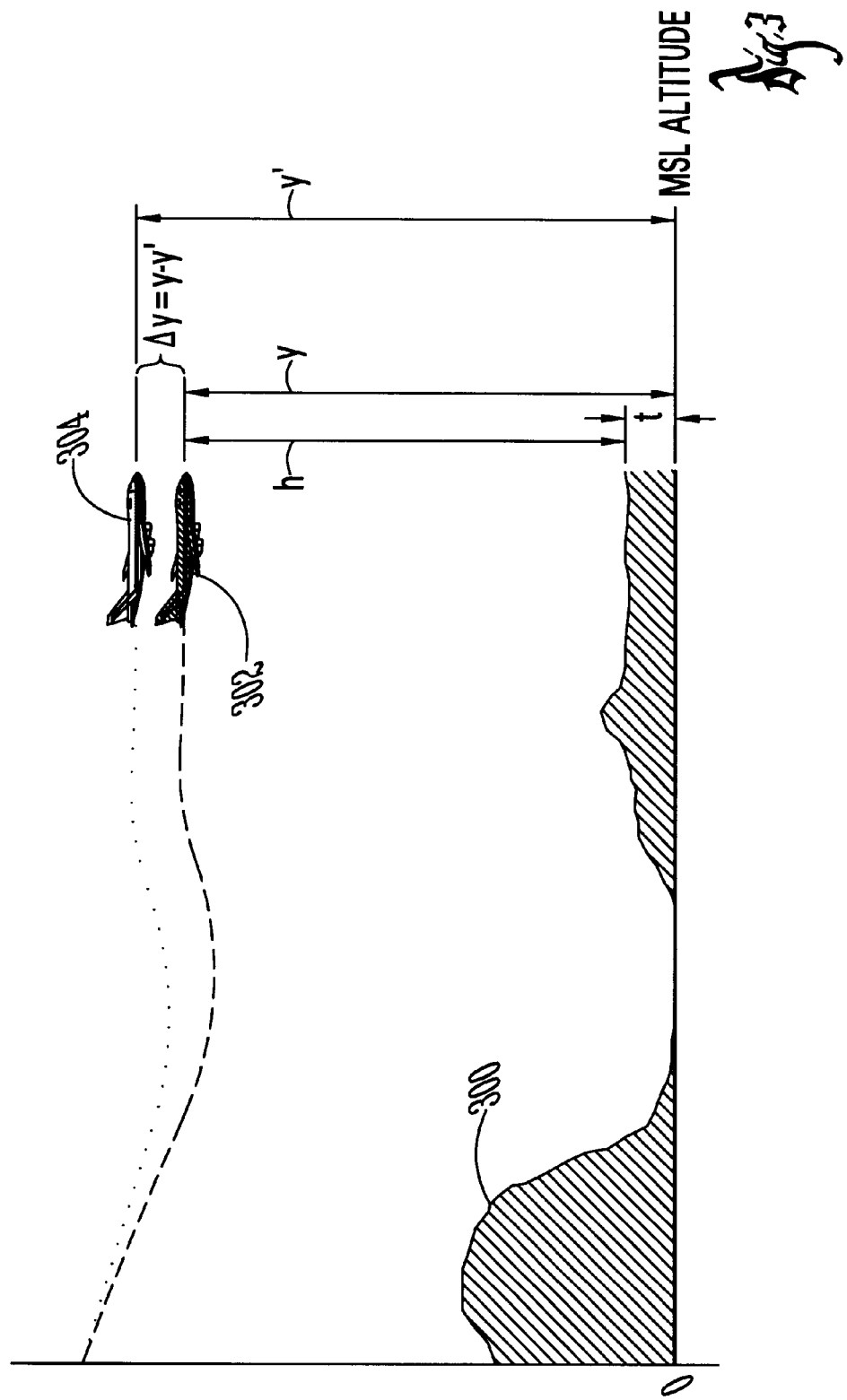

METHOD AND APPARATUS FOR USING STATISTICAL DATA PROCESSING IN ALTIMETER AND TERRAIN AWARENESS INTEGRITY MONITORING SYSTEMS

FIELD OF THE INVENTION

The present invention generally relates to baro altimeter and terrain awareness and warning systems (TAWS), and more particularly relates to integrity monitoring of such systems, and even more particularly relates to methods and apparatuses for increasing confidence levels associated with information provided by baro altimeter and TAWS systems.

BACKGROUND OF THE INVENTION

In the past, baro altitude and TAWS systems have provided critical information to pilots and flight crews. Avionics engineers have routinely endeavored to provide high integrity systems with associated high confidence levels for the information they provide. One approach has been to provide independent and dual redundant TAWS and baro altitude systems on each aircraft. Independent and redundant TAWS and baro altitude systems would typically have complete duplication of equipment that exists on-board the aircraft. For example, dual GPS receivers, dual terrain databases and dual database servers would be required for an independent dual redundant TAWS system.

While these independent and dual redundant systems may have many advantages in particular uses, they also have significant drawbacks. One common drawback of these designs is that they are very expensive. Another drawback of this approach at improving system integrity is the potential for common failure modes or common error sources. For example, for the TAWS, either the two TAWS systems are required to use two independently derived and supplied terrain databases, which are very expensive, or it is required to accept the potential for database errors which are common to each independent system. Additionally, errors in GPS positioning arising from sources other than the receivers on-board the aircraft are common to a redundant TAWS system. For the baro altitude sensor, dual identical systems have potential for common errors in the quality of current local baroset values available and to pilot error in entering such information.

Consequently, there exists a need for improved methods and apparatuses for improving the confidence levels in information provided by baro altitude and TAWS systems.

SUMMARY OF THE INVENTION

It is an object of the present invention to provide an aircraft with baro altitude and TAWS systems having high confidence levels associated with the information they provide.

It is a feature of the present invention to utilize a radar altimeter to confirm information being generated by the TAWS system and/or the baro altimeter.

It is an advantage of the present invention to provide integrity enhancement without the need for completely dual redundant systems.

It is another advantage of the present invention to detect systemic remote errors which would not be detectable with on-board dual redundant TAWS and baro altimeter systems.

It is another feature to utilize a statistical sampling method to rapidly correlate measured height above ground data, obtained from a radar altimeter, with respect to calculated or expected height above ground data from a TAWS system.

It is another advantage of the present invention to provide a quick and cost-effective method for detecting a TAWS system which has failed or is providing excessively erroneous information.

It is yet another feature to utilize a statistical sampling method to rapidly correlate measured height above ground data, obtained from a radar altimeter in combination with elevation of terrain information from a TAWS system, with locally corrected baro altitude information.

It is yet another advantage of the present invention to provide a quick and cost-effective method for detecting a baro altitude system which has failed or has an excessive baroset error.

The present invention is an apparatus and method for monitoring the integrity of baro altitude and TAWS systems which are designed to satisfy the aforementioned needs, provide the previously stated objects, include the above-listed features and achieve the already articulated advantages. The present invention is carried out in a "dual redundant-less" manner in a sense that the need to provide identical and duplicate baro altitude and TAWS hardware has been greatly reduced.

Accordingly, the present invention is an integrity monitoring system for TAWS and baro altitude systems which utilizes a radio altimeter and statistical sampling to confirm a high degree of correlation between measured height above ground with calculated height above ground and/or between corrected baro altitude and calculated height above means sea level.

BRIEF DESCRIPTION OF THE DRAWINGS

The invention may be more fully understood by reading the following description of the preferred embodiments of the invention, in conjunction with the appended drawings wherein:

FIG. 3 is a side view of a representative aircraft where the dashed lines represent the actual vertical path profile of the aircraft and the dotted lines represent an erroneous vertical path profile as generated with reliance upon baro corrected altitude.

DETAILED DESCRIPTION

Figure 1:
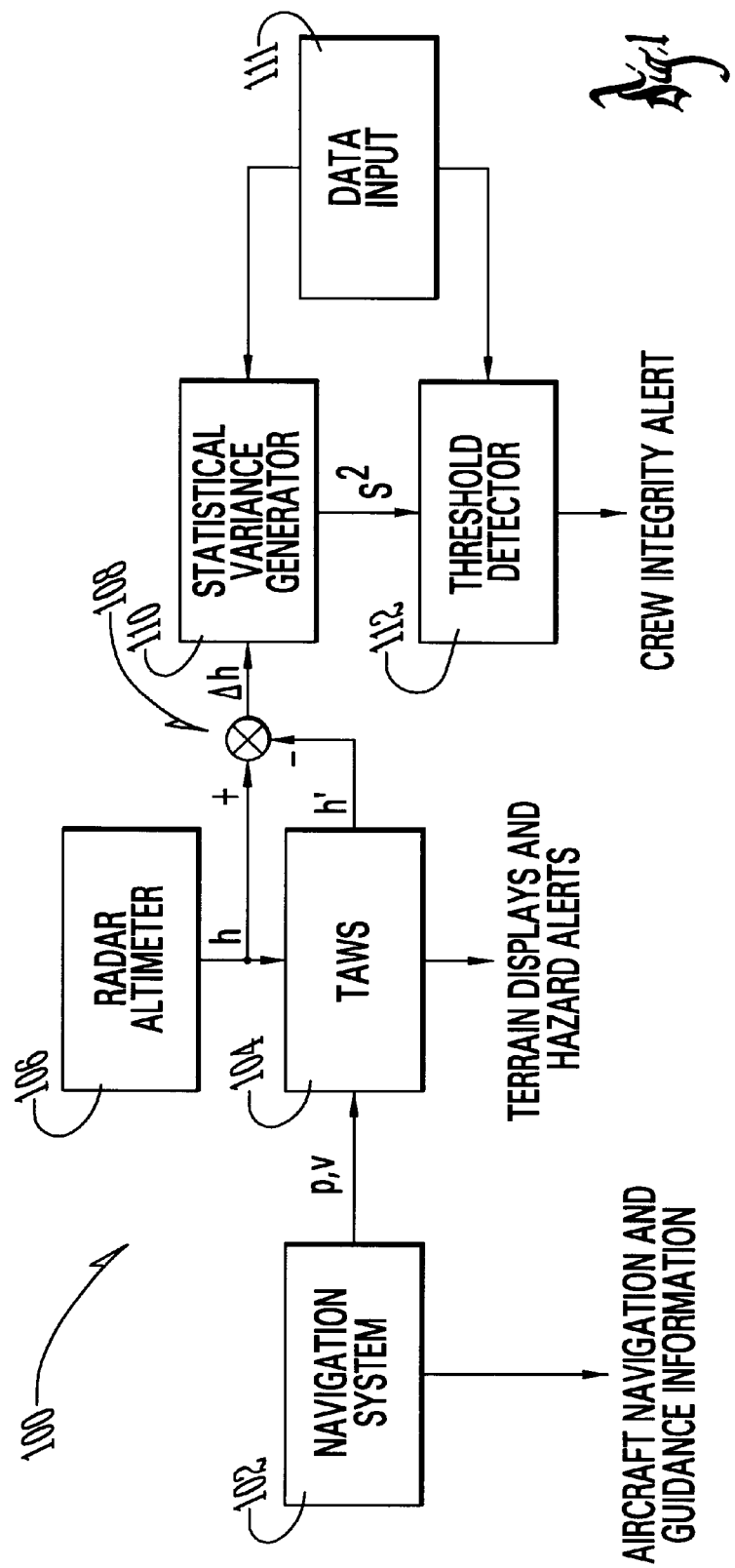
FIG. 1 is a simplified block diagram of a TAWS system of the present invention which shows a comparison and processing of output from the TAWS and a radar altimeter.

Now referring to the drawings, wherein like numerals refer to like matter throughout, there is shown in FIG. 1 an integrity enhanced TAWS system, generally designated 100, having a navigation system 102, which can be any type of precise three-dimensional area navigation system, such as a GPS or inertial reference system with baro aiding. Navigation system 102 provides aircraft navigation and guidance information to other systems on-board the aircraft, such as cockpit displays and autopilot systems. Navigation system 102 also provides three-dimensional p (position) and v (velocity) signals to TAWS system 104, which are well known in the art and are also known by such names as enhanced ground proximity warning systems and ground collision avoidance systems. TAWS system 104 would normally generate information to drive cockpit displays and to provide visual and aural terrain hazard alerts to the pilot and flight crew. During a typical process of generating such information, a typical TAWS system would also calculate, among others, a current estimated height above terrain datum. This could be done by subtracting a ground elevation datum from a current elevation, above sea level for the aircraft. This calculated height above terrain, or expected radar altitude, is depicted in FIG. 1 as h'. FIG. 1 also shows a radar altimeter 106, which is well known in the art and is commonly found on most commercial and military aircraft. Radar altimeter 106 measures the current height above the ground, or actual radar altitude, depicted herein as h. This is done using well-known methods. Typically, radar altimeter 106 can produce a continuous stream of height above ground data for use by various on-board instruments. The h and h' signals are mixed at comparator 108, where a difference, Δh, is generated.

Δh is sampled frequently and is used, by statistical variance generator 110, to calculate a short-term statistical correlation (variance) of the difference of h' and h. Preferably, statistical variance generator 110 is sufficiently robust to provide variable performance depending upon the particular needs at the moment. For example, the time of historical statistical correlation between h and h' can be dependent upon the stage of flight. Data input 111 may provide such stage of flight information and may be any system which provides information relating to operational characteristics of the aircraft, such as the stage of flight, flap configuration, landing gear configuration etc. During an en route phase, the time may be several minutes, while during approach, when a high level of integrity is required, the time may be just a few seconds. If the variance of the samples Δh exceeds a predetermined value, as detected by threshold detector 112, a warning alert may be given to the flight crew, either aurally or visually or both. The crew then could take action to verify the integrity of navigation system 102 and TAWS system 104, by independent means, or to reduce the criticality of the flight operation, e.g. by terminating the approach etc.

Statistical variance generator 110 and threshold detector 112 may be a stand-alone processor or in a preferred embodiment, statistical variance generator 110 and threshold detector 112 may be integrated with other processors on the aircraft, such as a processor in the TAWS system 104.

In operation, the apparatus and method of the present invention could function as follows:

An aircraft is provided with a navigation system 102, a TAWS system 104 and a radar altimeter 106. TAWS system 104 continuously generates an expected radar altitude h', while radar altimeter 106 continuously generates a measured actual radar altitude h. The difference, Δh, between h and h' is sampled frequently to calculate a short-term statistical correlation of h and h'. According to statistical principles, the variance of the sample set (shown below as $S^2$) of Δh is an unbiased representation of the actual variance (known as $\sigma^2$) of the continuous Δh over the sampling period, where:

$$S^2 = \sum_{i=1}^{n} \frac{(h-h')^2}{n-1}$$

Where n is a relatively large number, such as 30 to 100, or any other number depending upon the confidence level desired.

A sampling rate of 10 hz with a period of 10 seconds may be used in a typical implementation of this method.

If $S^2$ is greater than a predetermined threshold, then a warning may be issued.

Figure 2:
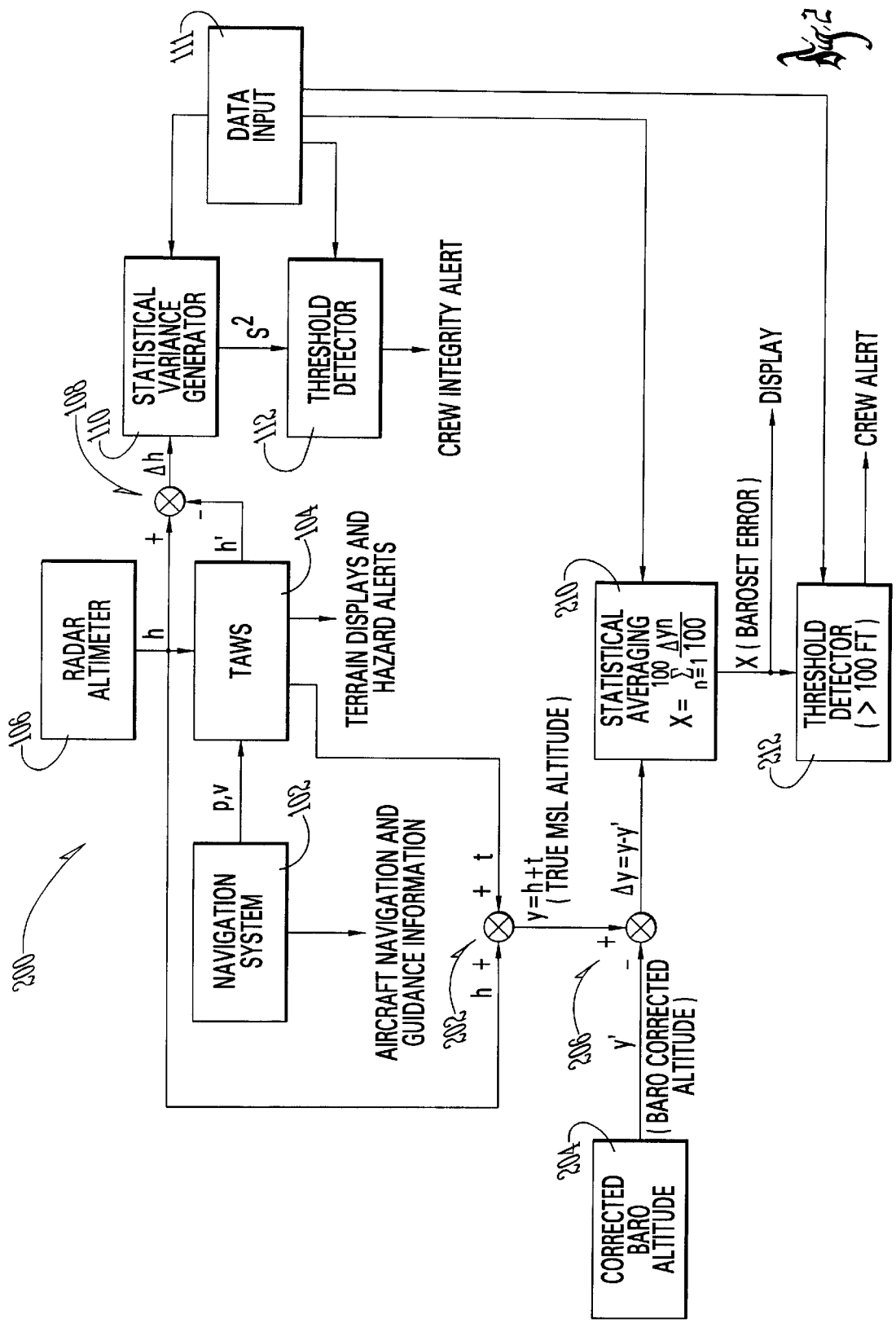
FIG. 2 is a simplified block diagram of a TAWS system of the present invention which shows an additional data source, the baro corrected altitude.

Now referring to FIG. 2, there is shown a system of the present invention, generally designated 200, including a true mean sea level altitude summer 202, which combines the measured height "h" above terrain from the radar altimeter 106 and the terrain elevation signal "t" from the TAWS system 104 to arrive at a true mean sea level altitude or MSL altitude signal "y."

A corrected baro altimeter 204 is shown providing a locally corrected baro altitude signal "y'" which is provided to baro altimeter summer 206 which subtracts "y'" from "y" to generate an instantaneous baroset error value Δy.

Δy is statistically averaged by baro statistical variance generator 210 in accordance with a predetermined averaging method to arrive at a stabilized baroset error "x". The structure of the apparatus providing the functions of baro statistical variance generator 210 may be similar or the same structure or hardware as that which provides for statistical variance generator 110. Baro statistical variance generator 210 provides its stabilized baroset error "x" to a display and to a baroset error threshold detector 212, which compares "x" with a predetermined threshold of baroset error and issues a crew alert when "x" exceeds the threshold. The pilot or member of the flight crew then can adjust the local baroset or use alternate means to confirm the accuracy of the local baroset value.

Now referring to FIG. 3, there is shown the terrain 300 and a simplified vertical path profile of an aircraft 302, which shows the radio altitude "h", the calculated true msl altitude "y", the elevation of terrain "t" and the Δy (which is y–y', the corrected baro altitude). An alternately positioned aircraft 304 is shown disposed at an altitude y' as provided by the corrected baro altimeter. The dashed line represents the true vertical path profile, while the dotted line represents the corrected baro vertical path profile. The difference between these two path profiles, at any given point along the path, is Δy, the instantaneous baroset error value.

It is thought that the method and apparatus of the present invention will be understood from the foregoing description, and that it will be apparent that various changes may be made in the form, construct steps and arrangement of the parts and steps thereof, without departing from the spirit and scope of the invention or sacrificing all of their material advantages. The form herein described is merely a preferred exemplary embodiment thereof.

I claim:

1. An apparatus comprising:
   a three-dimensional area navigation system for generating navigation signals representative of current position and velocity characteristics of an aircraft;
   a terrain warning system for generating signals representative of a computed relationship between an altitude characteristic of said aircraft and a database of terrain altitude characteristics for predetermined terrestrial locations, said terrain warning system further generating expected height above terrain signals;
   an altimeter for generating actual height above terrain signals representative of a measured altitude characteristic of said aircraft; and,
   a programmed computer processor, coupled to said terrain warning system and said altimeter, said programmed computer processor for determining a correlation characteristic between said expected height above terrain signals and said actual height above terrain signals; said programmed computer processor further for generating an integrity alert signal when said correlation characteristic exceeds a predetermined level.

2. An apparatus of claim 1 wherein said navigation system includes a GPS receiver.

3. An apparatus of claim 2 further comprising a data input for providing information representative of variable operational and pilot selectable characteristics of said aircraft.

4. An apparatus of claim 3 wherein said programmed computer processor is responsive to said information representative of variable operational and pilot selectable characteristics of said aircraft.

5. An apparatus of claim 4 wherein said altimeter is a radio altimeter.

6. An apparatus of claim 4 wherein said information representative of variable operational and pilot selectable characteristics of said aircraft is information representing that said aircraft is in an approach phase of flight, said programmed computer processor adjusts a sampling rate in response thereto.

7. An apparatus of claim 4 wherein said programmed computer processor adjusts a sampling period in response to said information representing that said aircraft is in an approach phase of flight.

8. An apparatus of claim 4 wherein said programmed computer processor adjusts said predetermined level in response to said information representing that said aircraft is in an approach phase of flight.

9. An apparatus of claim 4 wherein said programmed computer processor determines a sample s et variance in accordance with the following formula:

$$S^2 = \sum_{i=1}^{n} \frac{(h_i - h_i')^2}{n-1}$$

where
   n is a number of samples taken,
   h' represents said expected height above terrain signals, and,
   h represents said measured altitude characteristic.

10. An apparatus of claim 9 wherein n is variable in response to said information representing that said aircraft is in an approach phase of flight.

11. An apparatus of claim 1 wherein said altimeter is a radio altimeter.

12. A method of alerting a flight crew to integrity characteristics of a terrain warning system, comprising the steps of:
   sampling a signal representative of a difference between a radar altimeter measured altitude characteristic of an aircraft and a terrain warning system generated expected altitude characteristic of said aircraft; and generating a sample set in response thereto;
   generating an alert to a pilot when a variance of said sample set exceeds a predetermined level.

13. A method of claim 12 wherein said step of generating an alert includes a step of adjusting said predetermined level in response to stage of flight information.

14. A method of claim 12 wherein said variance of said sample set is calculated using the following formula:

$$S^2 = \sum_{i=1}^{n} \frac{(h_i - h_i')^2}{n-1}$$

where
   n is a number of samples taken,
   h' represents said expected height above terrain signals, and,
   h represents said measured altitude characteristic.

15. An apparatus for providing high integrity warnings to a pilot of an aircraft comprising:
   means for generating instantaneous train height signals representative of an instantaneous terrain height;
   means for generating measured clearance above ground signals representative of an instantaneously measuring a clearance above the ground using a signal bounced off terrain below said aircraft;
   means for summing said instantaneous terrain height signals and measured clearance above ground signals to produce a computed altitude above sea level signal;
   means for generating a measured locally baro-corrected altimeter signal representing aircraft altitude above sea level;
   means for generating a comparison signal comparing said computed altitude above sea level signal and said measured baro-corrected altimeter signal; and,
   means for issuing an alert when said comparison signal has predetermined characteristics.

16. An apparatus of claim 15 wherein said means for generating instantaneous terrain height signals is a system using satellite positioning and a database containing terrain elevations.

17. An apparatus of claim 16 wherein said means for generating measured clearance above ground signals is a radar altimeter which measures instantaneous height above terrain by timing a reflected signal.

18. An apparatus of claim 17 wherein said means for generating a comparison signal includes a signal mixer.

19. An apparatus of claim 17 wherein said means for issuing an alert includes a means for determining a variance of said computed altitude above sea level signals and said measured baro-corrected altitude above sea level signals.

20. An apparatus of claim 19 further comprising means for comparing said variance with a predetermined variance acceptance standard.

21. An apparatus comprising:
- a navigation system for generating navigation signals representative of current position and velocity characteristics of an aircraft;
- a terrain warning system for generating signals representative of terrain height characteristics for predetermined terrestrial locations;
- a radio altimeter for generating actual height above terrain signals representative of a radar measured altitude characteristic of said aircraft; and,
- a processor, coupled to said terrain warning system and said radio altimeter, said processor for summing the terrain height and radar measured altitude, and for statistically confirming an integrity characteristic of a relationship between said computed altitude above sea level characteristics and signals representative of characteristics of said aircraft with respect to measured baro-corrected altitude above mean sea level.

22. An apparatus of claim 21 further comprising:
- a baro altimeter for generating said signals representative of characteristics of said aircraft with respect to mean sea level.

23. An apparatus of claim 22 wherein said processor performs a statistical averaging of a baroset error difference between a computed altitude above mean sea level, which computed altitude is based upon a sum of said radio measured altitude characteristics and said signals representative of terrain altitude characteristics, and a baro altitude signal.

24. An apparatus of claim 23 further comprising a threshold detector for detecting when said baroset error difference exceeds a predetermined threshold.

25. An apparatus of claim 24 further comprising a display for displaying to a pilot a signal representative of an average baroset error.

26. An apparatus of claim 21 wherein said signals representative of characteristics of said aircraft with respect to mean sea level are generated by said terrain warning system.

27. An apparatus of claim 26 wherein said processor performs a statistical error calculation in which:

$$X = \sum_{i=1}^{n} \frac{\Delta y}{n} \text{ and } n = 100 \text{ nominally}$$

* * * * *